United States Patent [19]

Kampe et al.

[11] 4,438,216

[45] Mar. 20, 1984

[54] PROCESS FOR IMPROVED ACTIVATED CARBON HAVING AN ALUMINUM-HEAVY METAL SPINEL

[75] Inventors: Dennis J. Kampe, Parma; Srinivasan Sarangapani, Cleveland, both of Ohio

[73] Assignee: Union Carbide Corporation, Danbury, Conn.

[21] Appl. No.: 393,988

[22] Filed: Jun. 30, 1982

[51] Int. Cl.³ .................... H01M 4/96; H01M 4/88; H01M 4/04; C25B 11/06
[52] U.S. Cl. ................... 502/101; 204/290 F; 204/294; 252/508; 429/44; 502/185
[58] Field of Search ............... 252/422, 447, 425.3, 252/508; 429/42, 44, 5; 204/290 F, 294

[56] References Cited

U.S. PATENT DOCUMENTS

| | | | |
|---|---|---|---|
| 2,615,932 | 10/1952 | Marko et al. | 429/5 |
| 2,669,598 | 2/1954 | Marko et al. | 429/5 |
| 3,307,977 | 3/1967 | Kordesch | 429/42 |
| 3,405,010 | 10/1968 | Kordesch et al. | 429/44 |
| 3,415,689 | 12/1968 | Carson, Jr. et al. | 429/42 |
| 3,477,877 | 11/1969 | Kordesch | 429/42 |

FOREIGN PATENT DOCUMENTS 695442 10/1964 Canada ........................ 429/44

Primary Examiner—P. E. Konopka
Attorney, Agent, or Firm—Robert C. Cummings

[57] ABSTRACT

A method of producing an activated carbon having an aluminum-heavy metal spinel features the use of at least twice the stoichiometric amount of aluminum with respect to heavy metal in the preparation.

6 Claims, No Drawings

PROCESS FOR IMPROVED ACTIVATED CARBON HAVING AN ALUMINUM-HEAVY METAL SPINEL

The invention relates to activated carbon and particularly to a process of producing an improved activated carbon suitable for a gas diffusion electrode.

U.S. Pat. No. 3,307,977 relates to an electrochemical cell and discloses a catalyst which includes a spinel. The patent describes an air cathode which is prepared by impregnating a gas-permeable body such as activated carbon with a solution of at least one heat-decomposable salt of a heavy metal selected from the group consisting of iron, cobalt, nickel, manganese, chromium, copper, silver, gold, vanadium, titanium, uranium, thorium and the rare earths, and at least one heat-decomposable salt of aluminum and then heating the impregnated body to a temperature at which the salts decompose to form a catalyst. The spinels formed by the reaction are insoluble in caustic electrolytes and are at least partially conductive, which helps to minimize the resistance of an electrode. The patent specifies that approximately stoichiometric amounts of the salts are preferred so that a true spinel structure in the pyrolysis product is formed.

The patent states that the type of salt which is employed is not critical, but it should be one which decomposes without much difficulty and which possesses oxidizing properties. Nitrates and nitrites, i.e., the salts of nitric and nitrous acids, are preferred. Other salts which can be employed include those of hydrochloric acid, chromic acid, oxalic acid, acetic acid, and formic acid. The patent teaches that the temperature at which the spinels are formed is at least 700° C. to about 950° C.

A spinel catalyst made from cobalt and aluminum salts is preferred.

Although the patent was directed to a fuel cell, it has been found that the spinel formulation can be applied to air cathodes such as used in a chlor-alkali cell. Furthermore, activated carbons containing spinels have been found useful in metal-air batteries, porous flow-through electrodes, and primary batteries.

The air cathode is the site at which oxygen and water are converted to hydroxide ions. The intermediate product, peroxide ion is rapidly converted to hydroxide ion in the presence of a catalyst such as a spinel compound or a precious metal.

The reactions are as follows:

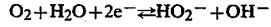

$$O_2 + H_2O + 2e^- \rightleftharpoons HO_2^- + OH^- \quad (1)$$

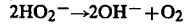

$$2HO_2^- \rightarrow 2OH^- + O_2 \quad (2)$$

The reaction of equation (2) proceeds slowly if by a chemical decomposition in general and more rapidly in the presence of a peroxide decomposition catalyst. If the $HO_2^-$ intermediates are not decomposed, the increased level results in lower potentials, degradation of the structure, and shorter lifetimes. Consequently, improvements in the catalytic activity and stability of the spinel catalyst are desirable.

A study was made of mixed oxides in the form of $CoAl_2O_4$ prepared in accordance with the prior art on activated carbons. It was found that the cobalt level in air cathodes which failed after several hundred hours was significantly lower than the initial levels. The aluminum-cobalt oxides aid in the decomposition of peroxide generated by the cathode; the loss of cobalt from the mixed oxides results in an increase of peroxide concentration within the pores of the cathode. This results in an increased concentration polarization and increased carbon oxidation. The former lowers the voltage and power savings and the latter results in reduced lifetime. Therefore, it was realized that it is necessary to improve the initial and long term stability of the mixed oxide catalyst to obtain an improved activated carbon.

As a result of this study, it was realized that the prior art spinel formulations contained significant amounts of mixed oxides which were not of the spinel structure.

In its broadest embodiment, the invention relates to a method for producing an activated carbon comprising treating carbon black with a solution of heavy metal and aluminum salts and subsequently heating to form a predetermined spinel, the improvement comprising the selection of at least twice the stoichiometric amount of aluminum with respect to the heavy metal for the spinel.

A preferred embodiment uses cobalt nitrate and aluminum nitrate with the amount of aluminum being from about two to about four times the stoichiometric amount.

The metal salts, such as those of cobalt, and the aluminum salt must react together to form the $CoAl_2O_4$ spinel on activated carbon. The process of U.S. Pat. No. 3,307,977 has been modified by the inclusion of ruthenium chloride as described in U.S. Pat. No. 3,405,010. It is necessary to take steps to insure that the desired spinel oxide will form and not the individual oxides or uncovered nitrates.

It has been found that if one follows the stoichiometric requirement of two atoms of aluminum to one atom of cobalt, then the requirements to achieve the desired spinel are more restrictive. If pure salts of cobalt and aluminum nitrate are heated together, the following reaction can occur:

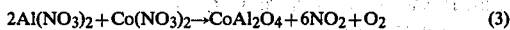

$$2Al(NO_3)_2 + Co(NO_3)_2 \rightarrow CoAl_2O_4 + 6NO_2 + O_2 \quad (3)$$

This stoichiometric reaction has now been studied, and it requires long reaction times or sophisticated techniques such as freeze-drying to achieve substantially complete conversion. In ordinary evaporation processes, water of crystallization can remain and a considerable amount of phase separation can occur during the heating process. When this solution is mixed with an adsorptive carbon black, additional problems can arise. Different metal ions are adsorbed to different extents on the carbon surface, the ions migrate to different degrees when the solids are dried in bulk, and local concentrations of metal ions on the dried carbon can depart greatly from the desired stoichiometric ratios. The formation of cobalt-aluminum spinel occurs by mutual diffusion of cobalt oxide and aluminum oxide produced by the thermal decomposition of the respective nitrates. A local deficiency of aluminum oxide results in unreacted cobalt oxide.

As a result of this study, the surprisingly simple solution of providing an excess of $Al(NO_3)_3 \cdot 9H_2O$ was used to increase the likelihood of reacting with the cobalt oxides.

The carbon black can have either low or high surface area. If low surface area carbon black is used, then it is necessary to activate the carbon black to increase the surface area for certain applications.

The elevated temperature necessary for the steam activation of the carbon black also affects the thermodynamic equilibrium of the various oxides formed. During the activation process, the presence of carbon, carbon monoxide, oxygen, nitrates and oxides can result in many side reactions which limit or alter the desired aluminum-cobalt spinel. For example, the desired aluminum-cobalt spinel can be reduced by carbon monoxide, as follows:

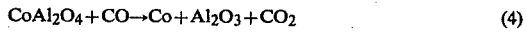

$$CoAl_2O_4 + CO \rightarrow Co + Al_2O_3 + CO_2 \qquad (4)$$

The elevated temperatures greater than 900° C. can result in the thermal decomposition of the aluminum-cobalt spinel as follows:

$$CoAl_2O_4 \rightleftarrows CoO + Al_2O_3 \qquad (5)$$

The rate of the formation of the aluminum-cobalt spinel from the two solid state oxides is relatively slow due to the physical diffusion process. The decomposition and reduction reactions shown in equations (4) and (5) coupled with the slot rate of formation of the spinel result in an oxide phase rich in the simple oxides with only a limited quantity of the desired aluminum-cobalt spinel. These simple oxides are either highly soluble in concentrated alkali or are very poor in catalytic activity. Therefore, it is necessary to produce and retain as much as is possible of the aluminum-cobalt spinel formed in order to insure chemical stability as well as catalytic activity. Our analysis has resulted in a further improvement in the process in the form of a second heat treatment at a temperature less than 700° C. and preferably in the range of from about 300° C. to 600° C. in an atmosphere comprising either steam or carbon dioxide.

Generally, according to the prior art, the aluminum-cobalt spinel for the air cathode is prepared as follows:

An aluminum nitrate cobalt nitrate solution is doped with ten weight percent with respect to cobalt of ruthenium in the form of ruthenium chloride.

An aqueous aluminum nitrate solution such as Al(NO₃)₃·9H₂O is added to cobalt nitrate such as CO(NO₃)₂·6H₂O and ruthenium chloride to obtain an atomic ratio of Al:Co:Ru of 2:1:0.1. The stoichiometric ratio of Al:Co is 2:1 in view of the spinel formation.

The spinel forming solution is either sprayed onto carbon powder or added to the carbon powder. This mixture is dried at a temperature of about 90° C. overnight, milled, and converted from the nitrate solution to the spinel oxide by the use of an elevated temperature or gaseous oxidation depending upon the initial surface area of the carbon black used. The purpose of using an elevated temperature is to convert the nitrates to oxides. The use of an oxidizing atmosphere such as steam, carbon dioxide, oxygen, or air increases the likelihood that a sufficient amount of oxygen will be present to maintain the conversion on the carbon substrate.

An elevated temperature, usually in excess of 900° C., is needed for at least one hour in order to effect the steam activation of the carbon black.

Illustrative, non-limiting examples of the practice of the invention are set out below. Numerous other examples can readily be evolved in the light of the guiding principles and teachings contained herein. The examples given herein are intended merely to illustrate the invention and not in any sense to limit the manner in which the invention can be practiced. The parts and percentages recited herein and all through the specification, unless specifically stated otherwise, refer to parts by weight and percentages by weight.

EXAMPLE 1

Carbons catalyzed with spinel solutions were prepared in accordance with the foregoing with solutions having a ratio of aluminum to cobalt of either 2:1 (stoichiometric) or 4:1 (2X stoichiometric). Steam activation at a temperature of about 900° C., was used to activate the carbon.

The measurements of ash levels confirmed the presence of the higher amounts of aluminum in the carbons.

The ability to decompose peroxide in the form of hydrogen peroxide was then measured for the activated carbons prepared according to the prior art and those made according to the invention. For this test, 0.5 grams of the carbon to be tested was stirred into 100 milliliters of 1 N sodium hydroxide. Hydrogen peroxide was injected into this mixture. The carbon decomposed the hydrogen peroxide to liberate oxygen and the oxygen was collected and measured. The amount of oxygen collected and the rate at which it is generated are measures of the efficiency of the activated carbon to decompose peroxide. This data is shown in Table 1.

The performance of the activated carbons in accordance with the invention was significantly greater than the prior art activated carbons.

TABLE I

| | | | COLLECTED OXYGEN | | | |
|---|---|---|---|---|---|---|
| Run No. | Formulation | Ash Content % | Initial Rate ml/sec · gC | 15 Sec. ml | 30 Sec. ml | 45 Sec. ml | 60 Sec. ml |
| 1 | Stoichiometric | 5 | 1.4 | 2.3 | 6.4 | 9.8 | 12.6 |
| 2 | 2X Stoichiometric | 10.5 | 2.8 | 8.5 | 15.7 | 22.0 | 27.6 |
| 3 | Stoichiometric | 7 | 3.6 | — | — | — | 31.5 |
| 4 | 2X Stoichiometric | 10 | 6.0 | — | — | — | >50 |

EXAMPLE 2

The activated carbons prepared for Runs 3 and 4 were used in this example for the Runs 5 and 6, respectively. The test for the capability of the activated carbons to decompose peroxides was carried out after continued contact with the caustic solution of the Example 1. The results of these tests taken after 72 hours and 168 hours are shown in Table 2 along with the values taken at the start, t=0 hours.

Table 2 shows that the activated carbon prepared according to the invention was considerably superior to the activated carbons prepared according to the prior art as evidenced by the significant loss in catalytic activity of the prior art activated carbon.

TABLE 2

| | | COLLECTED OXYGEN | | | | | |
|---|---|---|---|---|---|---|---|
| | | 0 Hours | | 72 Hours | | 168 Hours | |
| Run No. | Formulation | Initial Rate ml/sec/gC | 60 Sec. ml | Initial Rate ml/sec/gC | 60 Sec. ml | Initial Rate ml/sec/gC | 60 Sec. ml |
| 5 | Stoichiometric | 3.6 | 31.5 | 1.6 | 12.5 | 0.7 | 3 |
| 6 | 2X Stoichiometric | 6.0 | >50 | 5.3 | 44 | 3.6 | 28.5 |

EXAMPLE 3

The stability of the various spinel formulations under acidic conditions was measured. For these tests, five grams of the activated carbon was stirred into one hundred milliliters of 1 N hydrochloric acid. After four hours, the solution was separated from the activated carbons. Any leachable cobalt oxide would be taken away with solution. The activated carbon was dried and then examined by X-ray fluorescence methods to determine the amount of cobalt remaining.

For an activated carbon prepared with a spinel formulation according to the prior art, 8 weight percent of the cobalt remained; in contrast, two activated carbons prepared according to the invention retained 32 weight percent in each case. That is, the activated carbons prepared according to the invention retained four times as much of the cobalt as the activated carbons prepared according to the prior art.

EXAMPLE 4

An activated carbon was prepared in accordance with the invention as set forth in the Example 1.

The activated carbon was divided into four batches and each batch was subjectd to a second heat treatment at 600° C. in a steam and nitrogen atmosphere of approximately 80% steam by volume. The batches were heat treated for 1, 2, 4, and 8 hours, respectively.

The batches were thereafter subjected to the acid leaching and X-ray fluorescence measurements of the Example 3. The batches retained 39, 57, 66, and 71 weight percent cobalt, respectively. This represents a significant improvement over the already described improvement of the Example 3.

We wish it to be understood that we do not desire to be limited to the exact details shown and described, for obvious modifications will occur to a person skilled in the art.

Having thus described the invention, what we claim as new and desire to be secured by Letters Patent, is as follows:

1. In a method for producing an activated carbon having an aluminum-heavy metal spinel comprising a first heat treatment that activates carbon and/or decomposes the soluble netal salts to their oxides or spinels, the improvement comprises the selection of at least twice the stoichiometric amount of aluminum with respect to the heavy metal for the spinel.

2. The method of claim 1, wherein the amount of aluminum is from two to four times the stoichiometric amount.

3. The method of claim 1, wherein the heavy metal is a cobalt salt.

4. The method of claim 1, wherein the spinel is $CoAl_2O_4$.

5. The method of claims 1 to 4, further comprising a second heat treatment at a temperature less than 700° C. in an atmosphere comprising either steam or carbon dioxide or a mixture thereof.

6. The method of claim 5, wherein the temperature is from 300° C. to 600° C.

* * * * *